Aug. 8, 1939.　　　W. B. PAINE　　　2,168,682
CLUTCH OPERATING MECHANISM
Filed Sept. 23, 1933　　　5 Sheets-Sheet 1

INVENTOR.
WILLARD B. PAINE
BY
ATTORNEY

Aug. 8, 1939.  W. B. PAINE  2,168,682
CLUTCH OPERATING MECHANISM
Filed Sept. 23, 1933   5 Sheets-Sheet 2

INVENTOR.
WILLARD B. PAINE
BY
ATTORNEY

Aug. 8, 1939.  W. B. PAINE  2,168,682
CLUTCH OPERATING MECHANISM
Filed Sept. 23, 1933  5 Sheets-Sheet 3

INVENTOR.
WILLARD B. PAINE
BY H. O. Clayton
ATTORNEY

Aug. 8, 1939.     W. B. PAINE     2,168,682
CLUTCH OPERATING MECHANISM
Filed Sept. 23, 1933     5 Sheets-Sheet 4

INVENTOR.
WILLARD B. PAINE
BY H. O. Clayton
ATTORNEY

Patented Aug. 8, 1939

2,168,682

UNITED STATES PATENT OFFICE 2,168,682

CLUTCH OPERATING MECHANISM

Willard B. Paine, South Bend, Ind., assignor to Bendix Aviation Corporation, South Bend, Ind., a corporation of Delaware Application September 23, 1933, Serial No. 690,641

8 Claims. (Cl. 192—.01)

This invention relates in general to the clutch mechanism of an automotive vehicle and in particular to power means for controlling the operation thereof.

More specifically, the invention relates to a pressure differential operated power means for selectively varying the mode of operation of a combined centrifugal and spring operated clutch. To this end there is suggested a manifold vacuum operated motor operably connected to the spring operated pressure plate of a clutch, said plate having mounted thereon centrifugally operated means supplementing the operation of the clutch springs in effecting an engagement of the clutch: however, the invention also comprehends the employment of the aforementioned power means to operate a conventional spring operated clutch structure, all centrifugal mechanism being omitted.

A further feature of the invention relates to the provision of power means for controlling the operation of the aforementioned combined centrifugal and spring operated clutch, said means being controlled in part by the means for operating the engine throttle of the vehicle: apropos the latter feature of the invention it is an object to so correlate the opening of the throttle with the cluch engaging operation of the power means as to insure an effective operation of the centrifugal means in engaging the clutch.

The invention also contemplates the provision of a pressure differential operated motor selectively operable, in disengaging the clutch, either (1) to move the pressure plate of the clutch just out of operative engagement with the friction element of the clutch, or (2) to move or lock the plate completely out of such operative engagement. The last-mentioned movement serves to render both the spring and the centrifugal clutch engaging means inoperative under all conditions of service, whereas the first-mentioned movement serves merely to lock out or render inoperative the spring means.

A further object of the invention is to provide a pressure differential operated motor operable, in controlling the clutch engaging operation of a combined centrifugal and spring operated clutch mechanism, to effect two distinct stages of movement of the pressure plate or the driven element of the clutch, the first stage being relatively rapid and terminating when the driving and driven clutch elements are about to be engaged by the spring means of the clutch, and the last stage being relatively slow to permit the centrifugally operated means to function prior to the functioning of the clutch springs.

Yet another object of the invention is to construct and arrange the parts of the aforementioned mechanism so as to correlate the timing of the centrifugal mechanism with respect to the timing of the clutch springs to the end that under ordinary driving conditions the clutch will be engaged by the action of the centrifugal mechanism, the clutch springs, after a predetermined delay, supplementing the centrifugal mechanism in effecting an engagement of the clutch.

Another object of the invention is to provide a control valve mechanism for a clutch controlling pressure differential operated motor, said valve mechanism being selectively operable to effect ony one of (1) a disengagement of the clutch and a subsequent relatively slow but constant rate of engagement thereof, (2) a disengagement of the clutch and a subsequent two-stage fast and slow engagement thereof, or (3) a complete cut out of the motor to render the same inoperative in its relation to the clutch.

Yet another object of the invention is to provide, in an automotive vehicle, a combined centrifugal and spring operated clutch in combination with a selectively operable conventional drive shaft free-wheeling unit, the clutch being selectively controllable by a power means to lock out the centrifugally operated mechanism of the clutch.

In general therefore it is the object of the invention to provide an automatically operable clutch structure operative to accurately simulate a skillful manual operation of the clutch to the end that the vehicle may be effectively accelerated under all conditions of service.

Other objects of the invention and desirable details of construction and combinations of parts will be apparent from the following description of a preferred embodiment of the invention, taken in conjunction with the accompanying drawings, in which.

Figure 1:
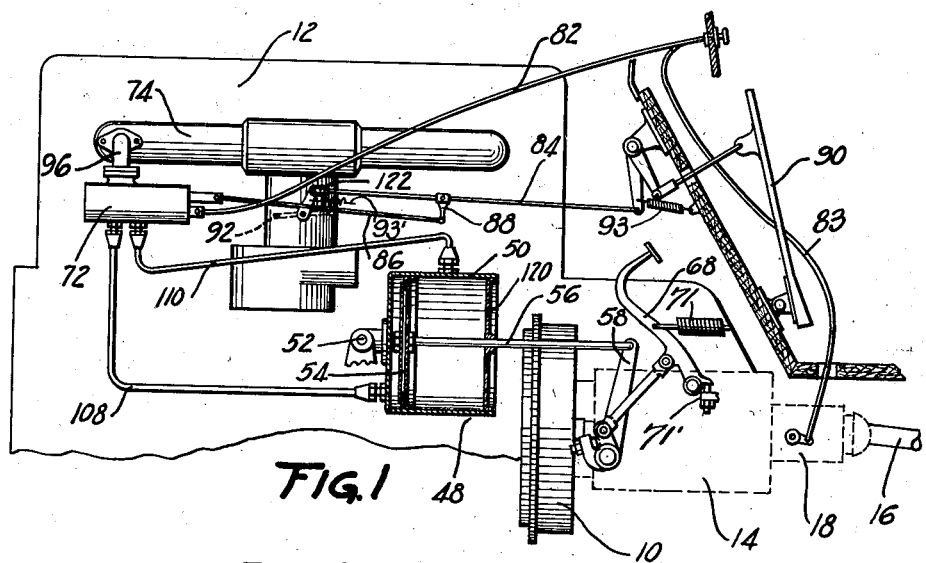
Figure 1 is a diagrammatic view of the clutch operating mechanism constituting the present invention.
Figure 10:
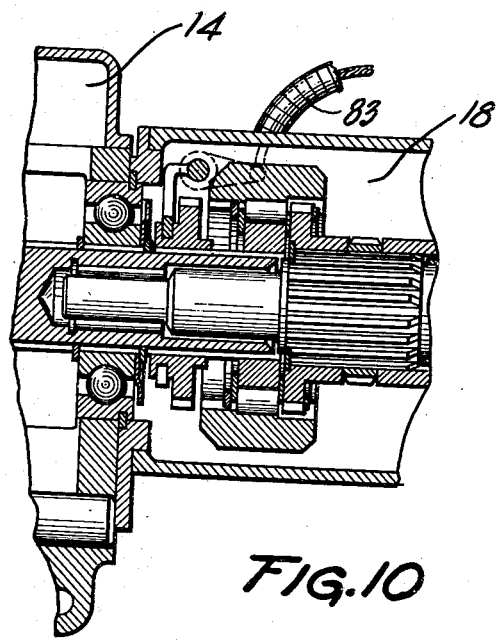
Figure 10 is a sectional view of a conventional type of free-wheel unit and Bowden wire operated cut-out therefor.

In that embodiment of the invention selected for illustration there is diagrammatically disclosed in Figure 1 a clutch mechanism 10 adapted to interconnect the internal-combustion engine 12 of an automotive vehicle with a conventional change-speed transmission 14, the latter drivably connected through a propeller shaft 16 with the driving wheels of the vehicle. A conventional form of overrunning clutch free-wheeling unit 18 may be incorporated in the shaft 16, such a unit, together with a conventional type of Bowden wire operated cut-out, being disclosed in Figure 10.

Figure 2:
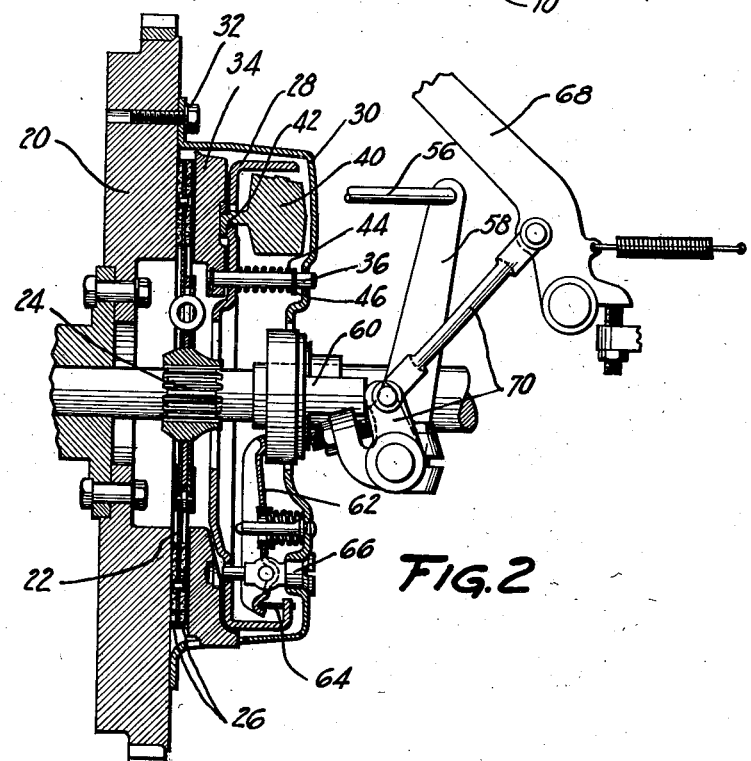
Figure 2 is a sectional view disclosing in detail the structure of the combined centrifugal and spring operated clutch to be controlled.
Figure 3:
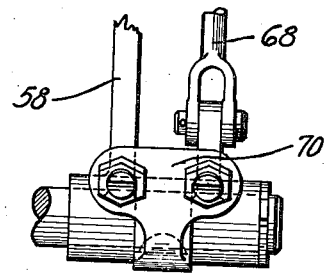
Figure 3 is a fragmentary view disclosing a portion of the connection interconnecting the clutch, the clutch motor and the clutch pedal.
Figure 4:
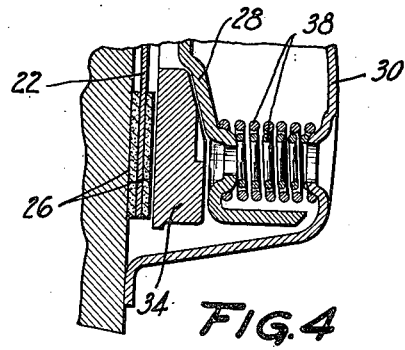
Figure 4 is an enlarged and fragmentary sectional view of a portion of the clutch structure of Figure 2 disclosing the clutch engaging springs.

The invention is directed to power means for controlling the operation of the clutch, the latter preferably though not necessarily being of a combined centrifugal and spring operated type. As disclosed in Figure 2, a flywheel 20, drivably connected with the engine 12, constitutes the driving element of the clutch, and a disk 22, slidably keyed to the propeller shaft 16 at 24 and provided with friction rings 26, constitutes the driven clutch element. The means for forcing the driven clutch element into driving engagement with the driving clutch element comprises a pressure plate 28, mounted within a cup-shaped housing 30 secured to the flywheel by fastenings 32. A ring 34, mounted on the plate by a plurality of pins 36, constitutes, together with the plate, a pressure applying unit, said unit being normally urged to the left, to engage the clutch, by means of a plurality of angularly spaced clutch springs 38, Figure 4.

A plurality of angularly spaced centrifugally operated weight members 40, each having a lever-like shank portion 42 extending through the plate 28 into engagement with the ring 34, functions to supplement the clutch engaging action of the springs 38 at or above a predetermined R. P. M. of the flywheel, the centrifugal force developed by the rotating weights serving to urge the weights outwardly in direct proportion to the angular speed of the flywheel and tending to force the ring from the plate and into engagement with the driven clutch element 26. Springs 44, sleeved over the pins 36 between the plate 28 and stops 46, serve as return springs to keep the plate and ring together when the flywheel is static or below the aforementioned critical angular speed. The loading of the clutch is thus the additive result of the effects of the clutch springs 38 having a constant maximum effect and the centrifugally operated weights 40, the effect of the latter being a variable the value of which is a function of the R. P. M. of the flywheel.

The invention is specifically directed to power operated means for controlling both the disengagement and the engagement of the aforementioned clutch, and in such fashion as to result in its most effective operation under various conditions of service of the vehicle, particularly when the latter is equipped with one of the so-called mechanical free-wheeling units incorporated in the drive shaft. The above described specific type clutch structure is not claimed herein, nor is the broad combination of a vacuum operated centrifugal clutch.

To the above end there is provided a manifold vacuum operated clutch motor 48 comprising a cylinder 50, pivotally secured to the chassis of the vehicle at 52, and a reciprocable piston element 54, the latter being operably connected to the pressure plate 28 of the pressure unit 28, 34 by a rod 56, crank 58, slidable collar 60, lever operating finger members 62 and pins 64. The finger members 62 are fulcrumed intermediate their ends upon pins 66, secured to the housing member 30. The pressure plate may also be operated to disengage the clutch by means of a conventional clutch pedal 68 interconnected with the sleeve 60 by linkage 70. A spring 71 serves to maintain the pedal 68 in its off position against a stop 71'.

A most important feature of the invention resides in the valvular mechanism for selectively varying the mode of operation of the aforementioned clutch operating motor. To this end there is provided a valve mechanism 72, which may be rigidly mounted to the engine block adjacent the intake manifold 74 as disclosed in Figure 1. The casing 76 of the valve is provided with parallel bores housing reciprocable valve plungers 78 and 80 hereinafter designated as accelerator and control plungers respectively. The plunger 80 is operated by a Bowden control 82 operable from the dash of the vehicle, and the plunger 78 is connected to a throttle rod 84 by links 86 and 88, the rod 84 serving as part of a connection interconnecting an accelerator 90 and butterfly valve or throttle 92. The accelerator and throttle are maintained in their off positions by springs 93 and 93' respectively. The valve casing is further provided with a vacuum port 94, interconnected with the manifold by a conduit 96, an air port 98 and motor ports 100 and 102, the latter interconnected with ports 104 and 106 respectively in the cylinder 50 at its end and middle portions by conduits 108 and 110, the latter shown diagrammatically by dotted lines. The valve plungers 78 and 80 are provided with various slots, bores, ports, etc., described in detail hereinafter and serving to variously interconnect the clutch motor with the atmosphere and manifold to direct and control the flow of air to and from the motor.

Figure 5:
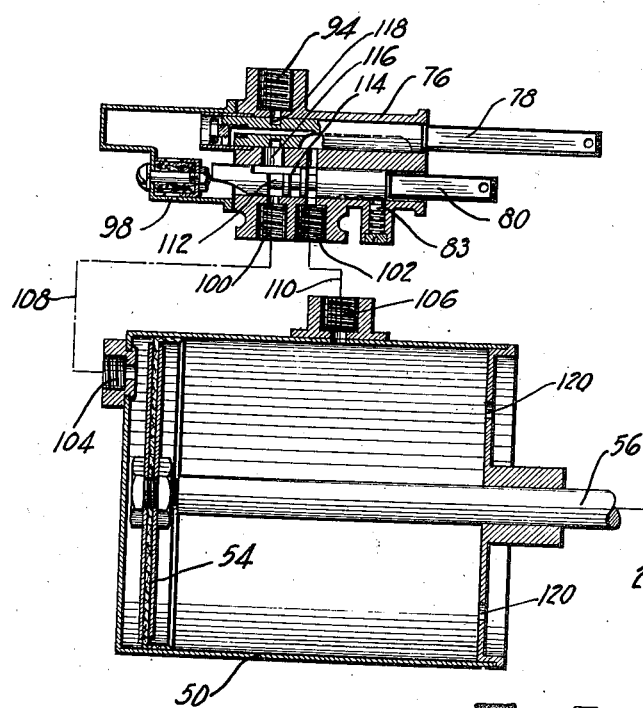
Figure 5 is a diagrammatic view, largely in section, disclosing the relative position of the parts of the mechanism when the clutch is disengaged, the centrifugal mechanism being rendered completely inoperative.
Figure 8:
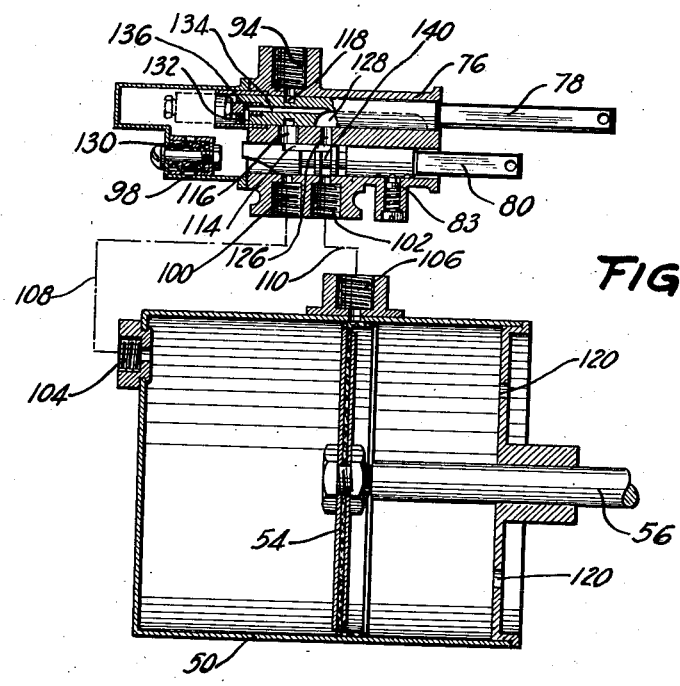
Figure 8 is a sectional view disclosing a position of the valve and motor parts with the clutch springs rendered inoperative, the centrifugal means however remaining operative to engage the clutch.
Figure 9:
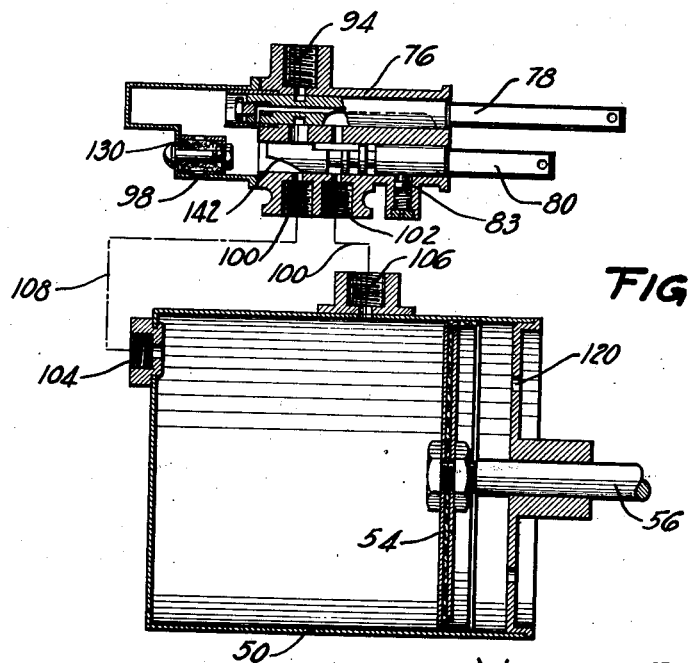
Figure 9 is a sectional view of a position of the motor and valve parts, the valve having been operated to cut out the operation of the clutch motor.

Passing now to a description of the operation of the aforementioned mechanism, the control plunger 80 may be set in any one of three positions disclosed respectively in Figures 5, 8 and 9 to effect three distinct modes of operation of the clutch. The position of the plunger disclosed in Figure 5 provides for the aforementioned lock out of the centrifugal means and the two-stage engagement of the clutch and is of particular utility when the free wheeling unit 18 is for any reason temporarily inoperative or when the aforementioned clutch mechanism is installed in vehicles which are not provided with a free-wheeling unit. When this condition exists it would be impossible, at relatively high vehicular speeds and in the absence of the vacuum lock-out mechanism, to quickly disengage the above described clutch to shift gears, for the flywheel is at this time driven, through the medium of the propeller shaft, by the coasting vehicle acting as a prime mover, and the centrifugal weights are urged outwardly to maintain the ring 34 separated from the plate 28 and keep the clutch engaged. However, with the clutch springs 38 completely compressed to move the pressure plate 28 to the extreme right, Figure 5, the weights 40 and ring 34 are impotent so far as affecting the driven element 26, irrespective of the angular speed of the flywheel. With the operation of the clutch motor about to be described the clutch may therefore be disengaged under all conditions of service despite the direct operative connection between the clutch and drive wheels of the vehicle. When the free-wheeling unit is in operation there is not a great deal of need for the above described lock out of the centrifugal mechanism, for with release of the accelerator to idle the engine the transmission, clutch and engine are temporarily disconnected from the propeller shaft, resulting in a relatively rapid deceleration of the flywheel to render the centrifugal weights inoperative. However, even with the free-wheeling unit in operation, the aforementioned vacuum lock out of the centrifugal mechanism has a measure of utility in that the clutch is disengaged more quickly with than without the vacuum mechanism in operation, for there is an appreciable degree of kinetic energy stored within the flywheel after the driving connection is broken with the propeller shaft, resulting in a time lag in rendering the centrifugal weights inoperative and a momentary slipping, and therefore undue wear, of the clutch.

Referring now to the operation of the valvular mechanism to effect the aforementioned control of the clutch motor, the control plunger 80 is set in its extreme left position, Figure 5, being locked by a spring pressed detent 83, and with the accelerator released to position the plunger 78 to the right in the figure the motor is evacuated by interconnecting the same with the manifold via conduit 108, port 100, a recess 112 and a slot 114 in the control plunger, a port 116 interconnecting the bores of the valve casing, an annular recess 118 in the accelerator plunger 78, port 94 and conduit 96. The piston 54 is thus forced to a position disclosed in Figure 5 by the loading effect of the atmosphere entering the motor via ports 120 in the end wall of the cylinder 50. Both the clutch springs 38 and the centrifugal weights 40 of the clutch mechanism are thus rendered completely inoperative to engage the clutch, the throw of the piston 54 being such as to force the pressure plate 28 far enough to the right as disclosed in Figure 5 to compensate for the maximum throw of the weights in separating the ring 34 from the plate.

Figure 6:
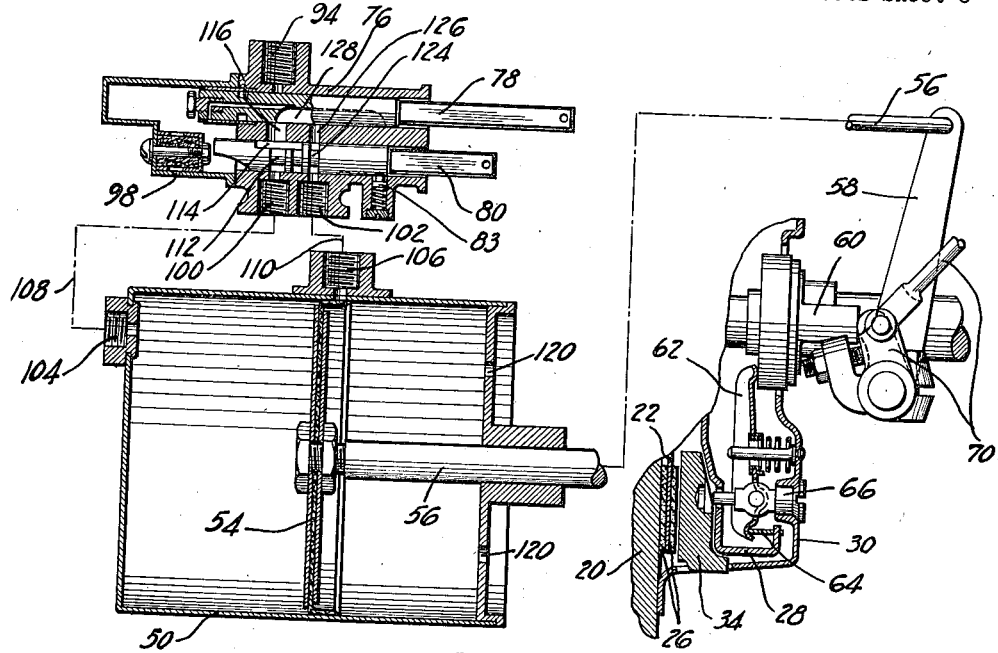
Figure 6 is a view, similar to that of Figure 5, disclosing the relative position of the parts of the mechanism during the engagement of the clutch and at the end of the first or rapid stage of clutch engaging movement.

When it is desired to engage the clutch, the accelerator is depressed, the first increment of movement taking up the slack in a lost motion connection 122 between the butterfly 92 and throttle rod 84 and moving the accelerator plunger 78 to the position disclosed in Figure 6. In this position of the plunger atmosphere from the right compartment of the clutch motor is by-passed to the evacuated left end of the motor via cylinder port 106, conduit 110, port 102, an annular recess 124 in the control plunger 80, a port 126 in the valve casing interconnecting the bores thereof, a slot 128 in the plunger 78, port 116, slot 114, recess 112, port 100, conduit 108, and port 104. The pressure differential acting to hold the piston to the left and the clutch disengaged is thus reduced, the piston rapidly moving to the right to the position disclosed in Figure 6 to cut off intercommunication between the port 106 and the atmosphere and render the left compartment of the motor bottle tight. The parts are so designed that when this position of the piston is reached the clutch springs 38 have been expanded to such a degree that any subsequent expansion will supplement the then operative centrifugal weights 40 in loading the driven clutch element to engage the clutch.

Figure 7:
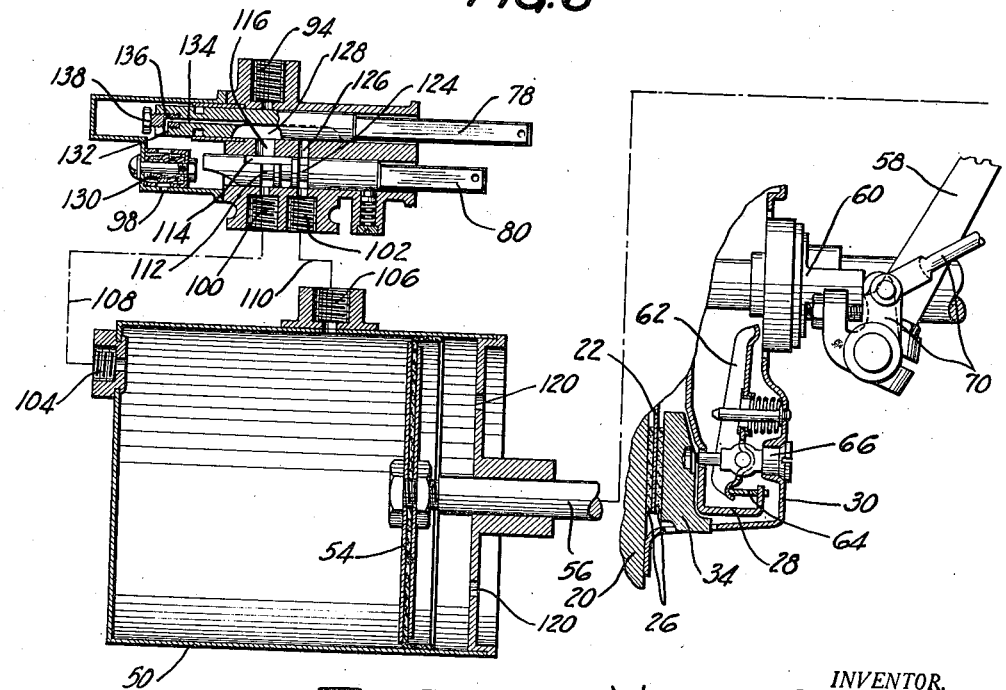
Figure 7 is a view, similar to that of Figure 5, disclosing the position of the parts of the mechanism with the clutch completely engaged.

Further depression of the accelerator, which may be designated as a second operative increment of movement thereof, serves to effect an approximate one-quarter opening of the throttle and simultaneously move the plunger 78 further to the left to its operative position disclosed in Figure 7. The piston 54 is then permitted to complete its clutch spring engaging or so-called cushioning movement at a relatively slow rate, this operation being effected by further admission of atmosphere to the left compartment of the motor via atmospheric port 98 and air cleaner 130, ducts 132 and 134 in the plunger 78, and an interconnecting angular duct 136 in an adjustable bleed valve member 138, slot 128, port 116, slot 114, recess 112, port 100, conduit 108, and cylinder port 104: a certain amount of air will also enter the motor via slot 128, port 126, recess 124, port 102, conduit 110 and cylinder port 106 when the piston has moved to the right to uncover the port 106. This relatively slow bleed of air into the motor may be varied by adjusting the screw threaded position of the valve member 138 within the plunger 78, the bleed preferably being determined to completely release the clutch springs 38 after an interval of from four to six seconds. During this time interval the weights 40 are functioning to engage the clutch and the parts are preferably constructed and arranged so that the effect of the weights precedes that of the clutch springs to insure a smooth clutch action under all conditions of service, and particularly in starting the vehicle from rest, the clutch engaging operation of the weights directly reflecting the R. P. M. and hence the torque of the engine. However, the clutch springs do have a useful function in that at the end of the aforementioned time interval the springs 38 are serving to augment the weights 40 in maintaining the clutch engaged, and should the engine be temporarily subject to a heavy torque, i. e., when laboring on an incline, thus reducing its R. P. M. and the effect of the weights 40, the clutch springs will nevertheless insure an adequate loading of the driven clutch member 26 to obviate undue slipping of the clutch; in fact, the parts are preferably so constructed and arranged that the clutch is completely engaged at the end of the aforementioned time interval, there being no slippage of the clutch.

As previously indicated, with the free-wheeling unit in operation there is no particular necessity to lock out of operation the centrifugal mechanism; therefore, the invention provides for a setting of the control plunger 80 whereby with a closing of the throttle the clutch springs are rendered inoperative to engage the clutch, the centrifugal mechanism, however, remaining operative above the critical speed of the flywheel. To this end the control plunger is moved to the position disclosed in Figure 8, and with a release of the accelerator the clutch motor piston 54 is moved to the position disclosed by the evacuation of the left end of the clutch motor via the middle cylinder port 106, conduit 110, port 102, a recess 140 in the plunger 80, slot 114, port 116, recess 118, port 94 and conduit 96. The pressure plate 28 is then positioned approximately as disclosed in Figure 6 to effect the aforementioned objects.

When it is desired to engage the clutch, the accelerator plunger is depressed to the dotted line position of Figure 8, which is the full line position of Figure 7. Air is then bled into the left compartment of the motor via port 98 and air cleaner 130, ducts 132, 136 and 134, slot 128, port 126, slot 114, recess 140, port 102, conduit 110 and port 106. The clutch springs 38 are thus permitted to supplement the weights 40 in exactly the same manner as described in connection with the lockout mode of control. It will also be observed that with the aforementioned control of the clutch and with the free-wheeling unit in operation the transmission is completely isolated upon release of the accelerator, thereby facilitating its operation in controlling the speed and direction of movement of the vehicle. As with the previously described lock-out control the effect of the centrifugal weights precedes that of the clutch springs in controlling the engagement of the clutch, the springs serving after a predetermined time interval, during which the throttle is opened a predetermined amount, to supplement the action of the weights to maintain an effective engagement of the clutch under all conditions of service.

The third setting of the control plunger 80 is disclosed in Figure 9, the object being to render the clutch motor completely inoperative and necessitate a manual disengagement of the clutch by the conventional clutch pedal 68. In this position of the control plunger communication with the manifold is cut off and the motor is permanently vented to the atmosphere via port 98, air cleaner 130, a cut-away end portion 142 of the plunger 80, port 100, conduit 108 and port 104.

This mode of control is useful when it is desired to cut out the automatic disengagement of the clutch with release of the accelerator and permit the engine to function as a brake to decelerate the vehicle: it is, of course, also necessary to lock out the operation of the free-wheeling unit, all modern vehicles equipped with such units being provided with such lock-out mechanism. The instant invention therefore satisfies State legislation requiring the vehicle to be equipped with means for selectively cutting out all free-wheeling mechanisms. If desired, the Bowden control 82 may be so interconnected with the free-wheeling unit 18 as to serve as a common means for cutting out both the clutch motor and unit 18. As disclosed in Figure 1 the control 82 is connected to the unit 18 by a control cable 83.

The invention also contemplates the use of the above described mechanism with the omission of the centrifugal weights, the clutch springs alone then functioning to engage the clutch. With this suggested mechanism both the two-stage and single-stage engagements of the clutch have utility in that the characteristics of certain of the clutches of the day demand a separation of the driving and driven elements appreciably beyond their clutch disengaged position, whereas with certain precision clutches, unvariable in operation, a relatively small clearance is necessary.

While one illustrative embodiment has been described, it is not my intention to limit the scope of the invention to that particular embodiment, or otherwise than by the terms of the appended claims.

I claim:

1. In an automotive vehicle provided with driving wheels and further provided with an internal-combustion engine and a throttle therefor, manually operable means for operating the throttle, a clutch, power means for controlling the operation of the clutch, power transmission means interconnecting the clutch and driving wheels, said latter means including a free-wheeling unit, and means, operable in part by said throttle operating means, for selectively controlling the operation of said power means the operation selected depending upon whether or not the free-wheeling unit is operative or inoperative.

2. In an automotive vehicle provided with driving wheels and further provided with an internal-combustion engine having a throttle control therefor, an accelerator for operating the throttle, a combined centrifugal and spring operated clutch, power means for controlling the operation of the clutch, power transmission means interconnecting the clutch and driving wheels, said latter means including a free-wheeling unit, means for cutting out the operation of said latter unit, and manually operated means, controlled in part by the accelerator, for selectively controlling the operation of said power means to correlate said control with the control of said free-wheeling unit.

3. In an automotive vehicle provided with driving wheels, an internal-combustion engine having a manifold, a clutch and an accelerator, power transmission means interconnecting said clutch and driving wheels, a free-wheeling unit incorporated in said transmission means, means for selectively cutting in or out the operation of said unit, a manifold vacuum operated motor operably connected with said clutch to control the operation thereof, valvular means selectively operable to correlate the control of said motor in accordance with the operation of said free-wheeling control means and manually operable means mounted within the driver's compartment for operating said valvular means.

4. In an automotive vehicle provided with a combined centrifugal and spring operated clutch, a transmission, a drive shaft, a free-wheeling unit incorporated in said drive shaft, and means for selectively cutting in or cutting out the operation of said free-wheeling unit and comprising, in combination therewith, power means operably connected with said clutch, and valvular means selectively operable to effect either (1) an operation of said power means whereby the centrifugal mechanism of said clutch is rendered completely inoperative to engage the clutch when the free-wheeling unit is inoperative or (2) such an operation of said power means as to permit an operation of the centrifugal mechanism of the clutch when the free-wheeling unit is operative or (3) rendering the power means completely inoperative.

5. In an automotive vehicle provided with an internal-combustion engine having a throttle, an accelerator for controlling the operation of said throttle, a combined centrifugal and spring operated clutch, a transmission, a drive shaft, a free-wheeling unit incorporated in said drive shaft, and means for selectively cutting in or cutting out the operation of said free-wheeling unit and comprising, in combination therewith, power means operably connected with said clutch, and manually operated valvular means, operated in part by the accelerator, selectively operable to effect either (1) an operation of said power means whereby the centrifugal mechanism of said clutch is rendered completely inoperative to engage the clutch when the free-wheeling unit is inoperative or (2) such an operation of said power means as to have no effect upon the centrifugal mechanism of the clutch when the free-wheeling unit is operative.

6. In an automotive vehicle provided with a throttle, an accelerator, means interconnecting said throttle and accelerator, and a clutch, the latter comprising a driving member, a driven member, and means for forcing said members into driving engagement one with another to propel the vehicle, said latter means comprising clutch springs, and a clutch spring operated pressure plate, power means for controlling the operation of said clutch springs to control the mode of engagement of the clutch, and selectively operable control valve means for said power means, said valve being controlled in part by said accelerator and operable to (1) render said power means inoperative, or (2) effect a two-stage operation of said power means to provide a two-stage engagement of the clutch, or (3) effect a one-stage operation of said power means to provide a one-stage engaging operation of said clutch, said first-mentioned connection being such as to permit an opening of the throttle only after the termination of the first engaging stage of the two-stage operation of the clutch or during the single-stage engagement of the clutch.

7. In an automotive vehicle provided with a throttle, an accelerator for operating the throttle, and a clutch comprising driving and driven members, and clutch springs adapted to force said members into driving engagement one with another, power means for controlling the operation of said clutch, and a manually operable valve means, controlled in part by the accelerator, for selectively controlling the operation of said power means either (1) to effect a two-stage clutch engaging operation of said power means or (2) to effect a single-stage engaging operation of said power means, the operation of said valvular means being so correlated with the operation of the throttle as to provide for a predetermined timing relation between the engagement of the clutch and the opening of the throttle.

8. In a vacuum operated clutch control mechanism for an automotive vehicle, a control valve unit for predetermining the various modes of operation of said mechanism, said unit comprising a casing member provided with a plurality of ports including a vacuum port, an atmospheric port and two motor ports, and further comprising two independently operable manually operated plunger members, said plunger members being constructed to provide, together with said ported casing, a plurality of different power fluid transmitting circuits varying in accordance with the relative positions of said plunger within said casing.

WILLARD B. PAINE.